United States Patent [19]

Rosenheck

[11] 4,447,134
[45] May 8, 1984

[54] GRATING SIGNAL SYSTEM USING ZERO ORDER BEAM OF ACOUSTO-OPTIC MODULATOR

[75] Inventor: Bernard M. Rosenheck, Dix Hills, N.Y.

[73] Assignee: Litton Systems, Inc., College Park, Md.

[21] Appl. No.: 245,877

[22] Filed: Mar. 23, 1981

[51] Int. Cl.³ .......................... G02F 1/11; H01J 40/14
[52] U.S. Cl. ............................ 350/358; 250/214 AG; 346/108
[58] Field of Search ................ 350/371, 358; 358/235, 358/315, 331; 365/123; 346/108; 250/214 AG; 332/7.51; 354/5, 7, 9, 10, 13

[56] References Cited

U.S. PATENT DOCUMENTS

| 3,573,849 | 4/1971 | Herriot et al. | 346/108 |
| 3,820,123 | 6/1974 | Ammann | 346/108 |

FOREIGN PATENT DOCUMENTS

| 90957 | 8/1978 | Japan | 350/358 |
| 3556 | 1/1979 | Japan | 346/108 |
| 68261 | 6/1979 | Japan | 332/7.51 |
| 97319 | 8/1979 | Japan | 250/214 AG |
| 102832 | 8/1981 | Japan | 350/358 |

*Primary Examiner*—William H. Punter
*Attorney, Agent, or Firm*—Robert F. Rotella; Michael H. Wallach

[57] ABSTRACT

An optical grating signal system for an use in a document recording system is shown having an acousto-optic modulator which utilizes the zero order beam of the modulator to scan a grating and a grating signal detector. When a modulating signal is applied to the acousto-optic modulator to generate a first order beam that records information, the intensity of the zero order beam is diminished. The same modulating signal is also applied to an amplifier which amplifies the output of the grating detector to increase the gain of that amplifier and thus maintain its output at a constant envelope level as the intensity of the zero order beam diminishes. The optics normally required to create a separate grating scanning beam are thus eliminated.

6 Claims, 3 Drawing Figures

GRATING SIGNAL SYSTEM USING ZERO ORDER BEAM OF ACOUSTO-OPTIC MODULATOR

The present invention relates to an optical grating signal system and, more particularly, to a system which utilizes an acousto-optic modulator to generate two beams comprising a document recording beam and a grating scanning beam and which compensates for a decrease in intensity of the grating scanning beam while the recording beam is being intensity modulated.

BACKGROUND OF THE INVENTION

It is well known in an optical recording system to utilize a single source of electromagnetic energy, such as a laser, to generate a pair of light beams by means of a partially reflective beam splitter. One beam is then modulated and scanned across a light sensitive media to record information thereon. The second beam is scanned across a spatial grating to generate a clock signal which indicates the location of the first beam as it scans across the light sensitive media.

The grating clock signal generated by the second beam allows precise timing control for modulation of the intensity of the first scanning beam and assures precise spatial alignment of the recording signal picture elements from one sweep to the next thus eliminating jitter between succeeding picture elements.

Generation of two beams by use of a partially reflective beam splitter requires additional optics including lenses and mirrors.

In most prior art systems, the recording of information upon a document is accomplished by modulating the intensity of a light beam that scans over the document. In some prior art devices, this modulation is accomplished through the utilization of an acousto-optic modulator. As is known, an acousto-optic modulator passes a beam of light, such as that generated by a laser, through its crystalline structure at the "Bragg" angle and in a generally straight line subject only to refraction caused as the beam passes into the crystalline material and exits therefrom. The exiting beam is commonly referred to as the "zero order" beam. By subjecting the crystalline material to a stimulant, such as acoustic energy created by a transducer mounted on one surface of the crystal, diffraction of the light beam passing therethrough occurs at twice the angle equal to the angle of the incoming beam. This beam is often referred to as the "first order" beam. As a consequence, the intensity of both beams vary with a modulating signal applied to the transducer.

In most prior art facsimile systems, the first order beam is utilized to record information while the zero order beam is not utilized and, in practice, absorbed so as not to interfere with the first order beam. An example of such arrangement is shown in a copending patent application entitled Aperture Stop Assembly For A Laser Beam Optical System by Albert H. Smith, Ser. No. 160,772, filed June 18, 1980, now U.S. Pat. No. 4,290,086, issued Sept. 15, 1981, and assigned to the same assignee as the present invention.

SUMMARY OF THE INVENTION

Accordingly, it is an object of the present invention to provide a grating signal system which eliminates the need for an aperture stop assembly and additional optics including a beam splitter mirror and lenses to create a second light beam to be utilized as the grating scanning beam.

Another object of the present invention is to provide a grating signal system which utilizes the modulated zero order beam of an acousto-optic modulator.

In accomplishing the objects set out above and others, there is provided an optical scanning system utilizing an acousto-optic modulator for generating a zero and first order beam. The first order beam scans across the recording media upon which information is to be recorded while the zero order beam is directed toward a grating and a grating detector. The output signal from the grating detector is applied to an amplifier which supplies an output grating signal that is used to establish the timing for modulation of the first order beam as it sweeps across the recording media. By applying a modulating signal to the acousto-optic modulator, the first order beam is generated which is then directed toward the media to record information thereon. Generation of the first order beam reduces the intensity of the zero order beam. In order to overcome the effect of the reduced zero order beam intensity, the modulating signal is also applied to the amplifier which receives signals from the grating detector. The modulating signal is utilized to increase the gain of the amplifier thus compensating for the reduced intensity of the zero order beam. In this manner, the zero order beam may be utilized to generate a grating signal whose signal envelope remains constant during the time that the modulator is energized or quiescent.

DESCRIPTION OF THE DRAWINGS

For a better understanding of the invention summarized above and of the objects and advantages presented thereby, the reader's attention is directed to the following specification and accompanying drawings, wherein.

DESCRIPTION OF THE PREFERRED EMBODIMENTS

Figure 1:
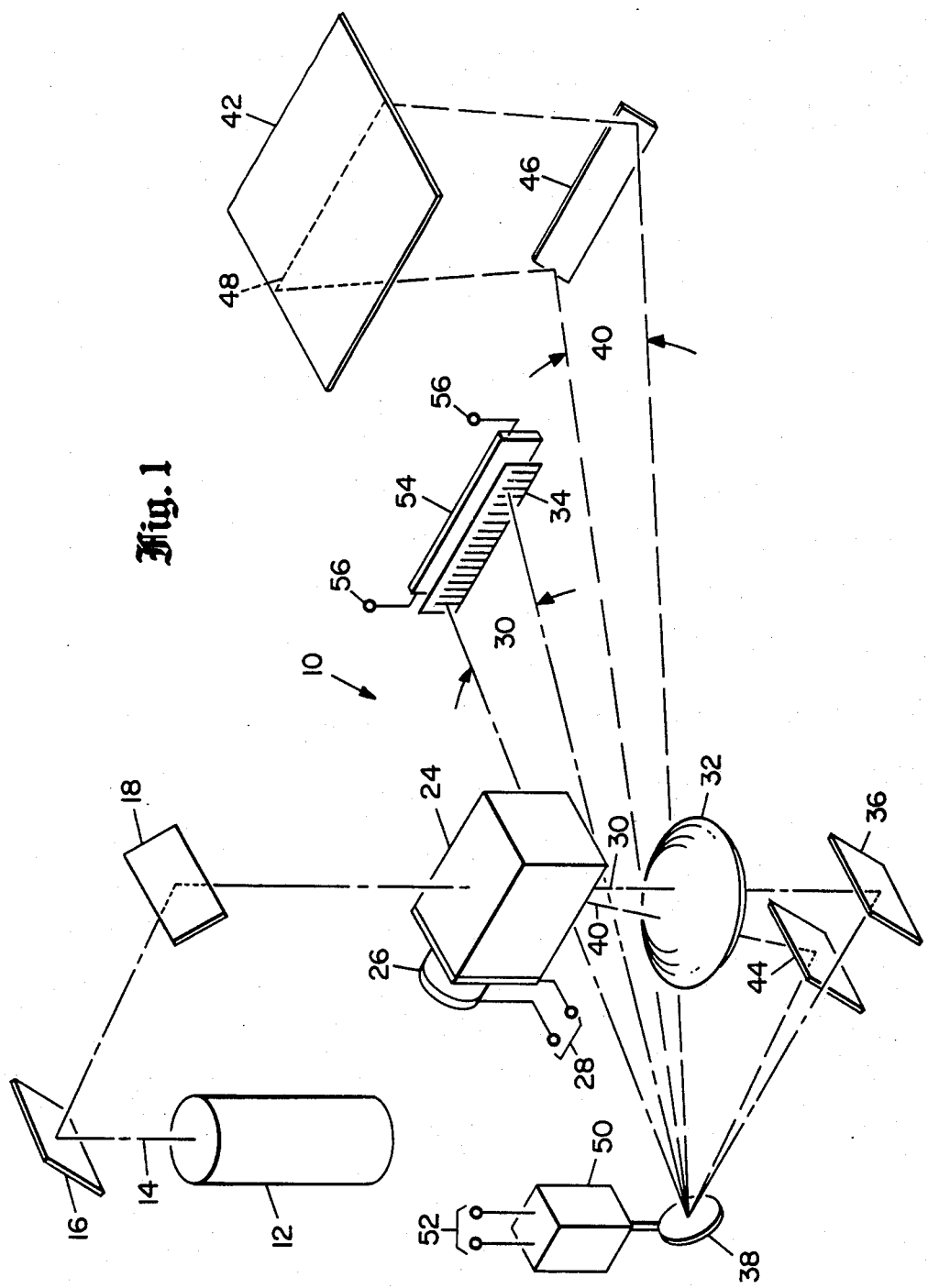
FIG. 1 is an exploded view showing an optical scanning system in which the grating signal system of the present invention may be utilized.

Referring now to the drawings, FIG. 1 shows an optical scanning system 10 including a source of electromagnetic energy such as laser 12 whose beam 14 is directed toward a reflective mirror 16. As the beam is reflected from mirror 16, it is reflected a second time by a mirror 18 and directed through an acousto-optic modulator 24, entering at an angle slightly to the left in FIG. 1. The crystalline structure of the modulator 24 is driven by a suitable transducer 26 through a pair of terminals 28 to which a modulating signal is applied.

When unenergized, beam 14 passes through the crystalline structure of modulator 24 with a small amount of refraction as it enters and exits the crystalline structure at an angle slightly to the right to create a zero order beam 30. The zero order beam 30 is focused by a lens 32 upon a grate 34 but is reflected by a first mirror 36 and a galvanometer mirror 38 prior to reaching the grate 34.

When a modulating signal is applied across terminals 28, the transducer 26 generates acoustical energy which flows through the crystalline structure of the modulator 24, diffracting the beam 14 and causing it to exit the modulator on the same side of a vertical center line as the beam 14 or at an angle slightly to the left. This diffracted beam forms a first order beam 40 which is also focused by the lens 32 upon recording media 42. The optical path of the first order beam 40 is reflected by a mirror 44 upon the galvanometer mirror 38 which, in turn, reflects the beam 40 upon a long beam folding mirror 46. Mirror 46 reflects the beam 40 onto the media 42 where the rotation of the galvanometer mirror 38 causes the beam to traverse the media 42 along a scan line 48.

The galvanometer mirror 38 is driven by a coil, not shown, rotatably mounted within a galvanometer frame 50. The frame mounts a pair of magnets, also not shown, which provide the magnetic field that interacts with the coil for rotating the galvanometer mirror 38 as a signal is applied to terminals 52 mounted on the galvanometer frame 50.

Rotation of galvanometer mirror 38 displaces the first order beam 40 across the surface of the mirror 46 and along scan line 48 on media 42 to the same degree as the mirror 38 displaces the zero order beam 30 along the grating 34.

The grating 34 is shown in the present embodiment as a planar substrate having individual markings ingraved or painted thereon. Located directly behind the transparent substrate which forms the grating 34 is a grating detector 54 having terminals 56. The detector 54 is shown as a long line diode in the preferred embodiment. However, a single point diode may be utilized by taking advantage of the invention described in a copending patent application entitled Grating Clock Assembly For Optical Scanning Systems by John F. Tregay, Ser. No. 245,813, filed Mar. 20, 1981 and now abandoned, which is assigned to the same assignee as the present invention.

Figure 2:
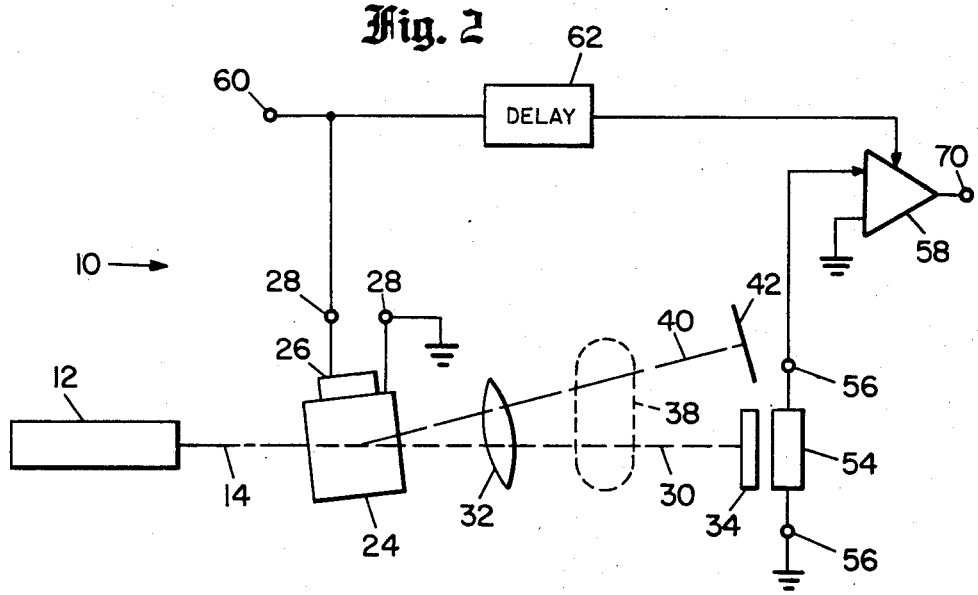
FIG. 2 is a schematic diagram of the present invention.

As best seen in FIG. 2, the output terminals of the grating detector 54 are connected between ground and the input terminal of an electronically adjustable gain amplifier 58 whose second input terminal is connected to ground. The modulating signal applied to the input terminals 28 of the acousto-optic modulator 24 in FIG. 1 is applied in FIG. 2 to an input terminal 60 and then to terminals 28. The modulating signal is further applied through a time delay circuit 62 to the adjustable gain amplifier 58 for increasing the gain of that amplifier as the delayed modulating signal is applied thereto. The time delay of circuit 62 is set equal to the time delay of the output light signal of modulator 24 with respect to its input signal at terminal 60.

Figure 3:
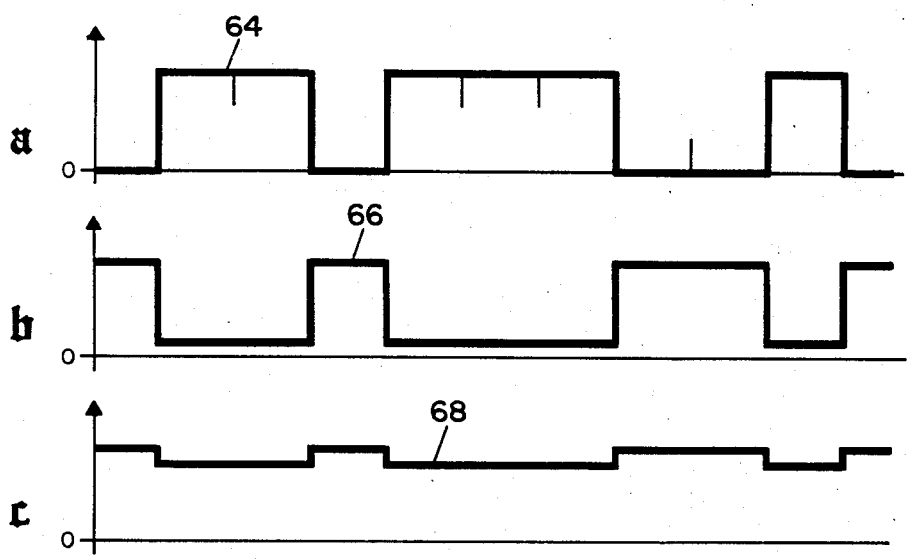
FIGS. 3a through c are timing diagrams used in explaining the operation of the present invention.

The effect of the delayed modulating signal upon amplifier 68 is illustrated in FIG. 3 wherein a modulating signal 64 is shown in FIG. 3a. In this figure, the signal 64 goes high if, for example, it is desired to record a black picture element (PEL) upon the media 42. In FIG. 3a, two such picture elements are shown before the signal goes low to record a white PEL followed by three black PELs, two white PELs, a black PEL and so on.

As the modulating signal 64 (applied to the acousto-optic modulator 24) goes high to energize the transducer 26, the intensity of the zero order beam 66 shown in FIG. 3b is substantially decreased. It will be understood that the beam 14 passing through the crystalline structure of the modulator 24 is diffracted by energizing the acoustic transducer 26 for forming the first order beam 40. However, not all of the energy is diffracted, thus leaving a small amount of energy still passing along the path described by the zero order beam 30 as shown by curve 66. As the zero order beam passes through the grating 34, it is interrupted by the grating to form a clock signal which is not shown for reasons of simplicity in FIG. 3b. This interruption by the etched marks upon grating 34 will cause a clock signal to be generated by the grating detector 54 during the time that the acousto-optic modulator 24 is energized or unenergized. The clock signal at 54 is reduced in amplitude when the acousto-optic modulator is energized and the envelope of the clock signal is shown by FIG. 3b.

It may now be noted that the modulating signal 64 is also applied to the adjustable gain amplifier 58 for increasing the gain of that amplifier during the time periods that the amplitude of the square wave signal 66 is reduced. The resulting output signal 68, FIG. 3c, is a substantially constant envelope grating signal which is applied to an output terminal 70 of the amplifier 58. The output grating signal 68 has a substantially constant envelope due to the varying gain of amplifier 58 under control of the modulating signal 64. Further, the interruption caused by the grating 34 continues throughout the signal 68 whose envelope is now substantially uniform.

In operation, the laser 12 generates a beam 14 which passes through the acousto-optic modulator 24 to form the zero order beam 30 that is focused by lens 32 upon the grating 34. Rotation of the mirror 38 causes the beam to sweep across the grating 34 for generating a clock signal at the output terminals 56 of detector 54. When a modulating signal 64 is applied to the acousto-optic modulator 24, a first order beam 40 is formed for recording information upon the media 42. As the modulating signal 64 is applied to the acousto-optic modulator 24 it is also applied to the adjustable amplifier 58 to increase the gain of that amplifier. Thus, as the output of detector 54 diminishes due to the substantially reduced intensity of beam 30 whose energy has been diffracted to form the first order beam 40, the gain of amplifier 58 is increased by the modulating signal 64 for producing a constant output envelope signal at terminal 70 which represents the output grating signal 68 established by the grating 34.

While the present invention has been described utilizing a laser 12 as the source of electromagnetic energy and a long line diode 54 as the detector, it will be understood that any source of electromagnetic energy may be utilized in place of the laser 12 and, similarly, a pin diode may be utilized in place of the long time diode 54 by utilizing a curved reflective surface as taught in the copending patent application by Tregay. Further, the single lens 32 may be replaced by a plurality of lenses if so desired and alternative means for achieving beam(s) deflection (such as a polygon scanner) may be utilized. Accordingly, the present invention should be limited only by the appended claims.

I claim:

1. An optical system for document recording having a source of electromagnetic energy which is passed through an acousto-optic modulator to generate a zero order beam and, when said modulator is energized by a modulating signal, a first order beam, comprising:
grating and detector means;
first optical means for directing said zero order beam through said grating onto said detector means to generate a grating signal;
second optical means for directing said first order beam upon said document when said acousto-optic modulator is energized by said modulating signal;

amplifier means for receiving said grating signal to produce an output grating signal; and said amplifier means also receiving said modulating signal for increasing the gain of said amplifier when said acousto-optic modulator is energized to produce a constant envelope level output grating signal.

2. An optical recording system, as claimed in claim 1, additionally comprising:

delay means to delay the application of said modulator signal to said amplifier means having a delay equal the delay of said acousto-optic modulator.

3. An optical recording system, as claimed in claim 1, wherein:

said zero order beam is a grating scanning beam and said first order beam is a recording beam.

4. An optical grating signal system for use in an optical recording system to indicate the position of a recording beam upon a document, comprising:

a source of electromagnetic energy which generates a light beam;

an acousto-optic modulator through which said light beam passes to create a zero order scanning beam;

means for generating a modulating signal which is applied to said modulator to create a first order recording beam;

grating and detector means;

first optic means for directing said zero order scanning beam upon said grating and detector means to generate a grating signal;

second optic means for directing said first order recording beam upon said document when said acousto-optic modulator is energized by said modulating signal thus reducing the intensity of said zero order scanning beam;

amplifier means for receiving said grating signal to produce an output grating signal; and said amplifier means having an adjustable gain for receiving said modulating signal to increase the gain of said amplifier means during said modulating signal to maintain said output grating signal at a constant envelope level when said intensity of said zero order scanning beam is reduced due to said modulating signal.

5. In a optical grating signal system, as claimed in claim 4, additionally comprising:

delay means connected between said means for generating a modulating signal and said amplifier means to delay said gain increase signal to said amplifier means to match the response of said acousto-optic modulator.

6. In an optical grating signal system for use in an optical recording system that includes a document recording beam and a grating scanning beam which scans a grating and grating detector to indicate the position of the document recording beam as it scans a document in response to a modulating signal, the improvement comprises:

an acousto-optic modulator whose zero order beam is used as said grating scanning beam to illuminate said grating detector through said grate to generate a grating signal and whose first order beam, generated by said modulating signal, is used as said document recording beam; and an adjustable gain amplifier connected to receive and amplify said grating signal and further connected to receive said modulating signal which increases the gain thereof to further amplify said grating signal as that signal is decreased due to the decreased intensity of said zero order beam from said acousto-optic modulator when said first order beam is generated by said modulating signal.

* * * * *

UNITED STATES PATENT AND TRADEMARK OFFICE
CERTIFICATE OF CORRECTION

PATENT NO. : 4,447,134
DATED : May 8, 1984
INVENTOR(S) : Bernard M. Rosenheck

It is certified that error appears in the above—identified patent and that said Letters Patent is hereby corrected as shown below:

Column 4, line 47, change "time" to --line--

Signed and Sealed this

Twenty-fifth Day of September 1984

[SEAL]

Attest:

GERALD J. MOSSINGHOFF

Attesting Officer

Commissioner of Patents and Trademarks